United States Patent [19]

Brüschke

[11] Patent Number: 4,915,834
[45] Date of Patent: Apr. 10, 1990

[54] MULTI-LAYER MEMBRANE AND THE USE THEREOF FOR THE SEPARATION OF LIQUID MIXTURES ACCORDING TO THE PERVAPORATION PROCESS

[75] Inventor: Hartmut Brüschke, Nussloch, Fed. Rep. of Germany

[73] Assignee: GFT Ingenieurbüro Für Industrieanlagenbau, Fed. Rep. of Germany

[21] Appl. No.: 197,055

[22] Filed: Apr. 27, 1988

Related U.S. Application Data

[60] Division of Ser. No. 778,741, Sep. 23, 1985, Pat. No. 4,755,299, which is a continuation of Ser. No. 499,847, Jun. 1, 1983, abandoned.

[30] Foreign Application Priority Data

Jun. 1, 1982 [DE] Fed. Rep. of Germany ....... 3220570

[51] Int. Cl.[4] .............................................. B01D 13/00
[52] U.S. Cl. ................................ 210/321.84; 210/490; 210/500.42
[58] Field of Search .................... 210/490, 500.42, 640, 210/321.84

[56] References Cited

U.S. PATENT DOCUMENTS 3,276,996 10/1966 Lazare ........................ 210/500.42 X
4,067,805 1/1978 Chiang et al. .................. 210/640 X
4,755,299 7/1988 Bruschke .

Primary Examiner—Frank Spear
Attorney, Agent, or Firm—Foley & Lardner, Schwartz, Jeffery, Schwaab, Mack, Blumenthal & Evans

[57] ABSTRACT

A multi-layer membrane having a porous backing layer of polyacrylonitrile, polysulfone or the like, and an active separating layer of polyvinyl alcohol or cellulose acetate. The membrane is particularly suitable for the separation of water-alcohol mixtures according to the pervaporation process.

18 Claims, 1 Drawing Sheet

MULTI-LAYER MEMBRANE AND THE USE THEREOF FOR THE SEPARATION OF LIQUID MIXTURES ACCORDING TO THE PERVAPORATION PROCESS

This application is a division, of application Ser. No. 778,741, filed Sept. 23, 1985, now Pat. No. 4,755,299, which is a continuation of Ser. No. 499,847, filed June 1, 1983, now abandoned.

BACKGROUND OF THE INVENTION

It is known in the art that liquid mixtures can be separated in that the liquid mixture is placed into contact with one side of a suitable polymeric membrane while a vacuum is applied to the other side of the polymeric membrane or an inert gas stream is guided past the same. Some of the components of the liquid mixture that permeate more rapidly through the polymeric membrane are continuously removed in vaporized condition from the side of the polymeric membrane in communication with the gaseous phase either by evacuation or by the inert gas stream. Non-permeating components are retained in the liquid phase accumulating therein until the desired degree of separation of components of a rapid and of a poor permeation and the desired degree of purity of the retained components of an inferior permeation, respectively, has been attained.

What is particularly noteworthy of this process, called liquid permeation or pervaporation and used for the separation of gas mixtures by means of membranes, is the fact that it also permits decomposition of such liquid mixtures into their components that cannot be separated by simple distillation because they either form azeotropes or the boiling points of the comoponents are so close as to prevent an effective and economical separation. For, in pervaporation, it is no longer the partial vapor pressure of the components above the liquid that determines the composition of the mixture in the gaseous phase, but rather the different permeability of the membrane and, hence, the selectivity thereof for the various components in the liquid mixture. On laboratory scale, for example, mixtures of benzene/cyclohexane and isopropanol/water could be separated beyond the respective azeotropic mixtures by means of pervaporation. Similarly, it was possible to separate the xylene isomers o-xylene (boiling point 144.4° C.), m-xylene (boiling point 139.1° C.) and p-xylene (boiling point 138.3° C.) by pervaporation in laboratory.

A special position is occupied by the mixtures of the simple oxygen-containing organic compounds, e.g. of the simple alcohols, ketones, ethers, aldehydes and acids, with water. On the one hand, these compounds, frequently, are technically important substances required in large scale for the most various applications in dry and anhydrous condition; conversely, these compounds, in general, completely or largely are miscible with water forming azeotropic mixtures with water so that the separation and recovery of the anhydrous organic substances involve substantial expenditure. Many attempts have therefore been made to use pervaporation processes for the separation of such mixtures; however, the efforts so far taken have never exceeded the stage of laboratory tests. Admittedly, the prior art membranes of cellulose diacetate and triacetate that are also employed otherwise, e.g., in reversing osmosis, for some purposes have an adequate mechanical stability and a satisfactory flow of permeate; however, the selectivity thereof does not yet permit a large-scale industrial use for pervaporation. The present invention is now concerned with a multi-layer membrane having a non-porous separating layer from a first polymer and a backing layer from a second polymer, which is characterized in that the separating layer is comprised of polyvinyl alcohol or cellulose acetate.

SUMMARY OF THE INVENTION

The membrane of the invention is suitable for the separation of liquid mixtures by means of liquid permeation or pervaporation, especially for the separation of water from its mixtures with oxygen-containing, organic liquids, such as simple alcohols, ethers, ketones, aldehydes or acids. Moreover, the membrane of the invention is also suitable for the separation of gas mixtures.

The membranes of the invention, owing to their multi-layer structures, on the one hand, have an excellent mechanical stability and, on the other hand, the separating layer can be applied to the mechanically stable backing layer with a thickness which is sufficiently thin to provide permeate flow and selectivity but also to permit industrial use of such membranes. In technical usage, the multi-layer membranes are also designated as compound or composite membranes.

DETAILED DESCRIPTION OF PREFERRED EMBODIMENTS

Figure 1:
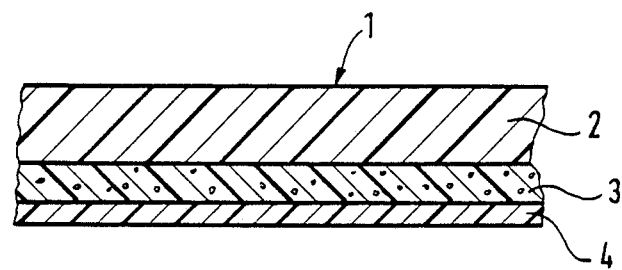

In accordance with the present invention, the separating layer of the membrane is comprised of polyvinyl alcohol or cellulose acetate. Polyvinyl alcohol is usefully obtained by saponification of polyvinyl acetate. Preferably, a polyvinyl alcohol is used that has a high saponification degree, e.g., a saponification degree in excess of 98 or 99 percent. The molecular weights are uncritical, if only film formation and membrane formation, respectively, are safeguarded. Usual molecular weights are within the range of between 15.000 and 200.000, e.g. between 70.000 and 120.000 (Daltons). Suitable products are commercially available. The cellulose acetates, in the first place, are cellulose diacetate and triacetate having the characteristics normally used in the production of membranes. Separating layers from polyvinyl alcohol are the preferred ones as they yield substantially improved results both as to selectivity and permeate flow.

In the separating layers it is necessary (as it is with the porous backing layers) that the polymers used in the present invention not be removed or attacked either by water or by the solvents to be separated.

The use of polyvinyl alcohol as a separating layer exhibits quite a number of characteristics. Polyvinyl alcohol is easily soluble in water for which reason it can in simple manner be applied from an aqueous solution, whereas polyvinyl alcohol is insoluble in all simple organic solvents. Polyvinyl alcohol, chemically and thermally, is stable; polyvinyl alcohol layers can be after-treated by cross-linkage to the extent that, in the long run, they are also insoluble in hot water showing only a swelling with water that can be adjusted by the type of the cross-linking reaction. Very thin, firmly adhering separating layers of polyvinyl alcohol that have an adequately high permeate flow can be applied to suitable backing layers. Owing to the conditions of manufacture, the properties of the polyvinyl alcohol separating layers are widely variable so that the pervaporation membranes produced thereby, with respect to selectivity and permeate flow can be optimally adapted to the respective problem of separation.

Insolubility of the polyvinyl alcohol in water is caused by cross-linkage. Preferably, cross-linking is performed by etherification, esterification or acetalization, or by a combined use of the said processes. Examples are esterification with dicarboxylic acids, preferably those that, in addition, contain hydroxyl- and/or keto-groups; etherification under catalytic exposure to acids, or by means of dihalogen compounds, such as 1,3-dichloroacetone or 1,3-dichloroisopropanol, or acetalization by means of aldehydes or dialdehydes. Based on ethanol/water mixtures, esterification, in general, results in an increased selectivity and acetalization leads to an increase in the rate of permeate flow while the influence of etherification on selectivity and permeate flow rate is less pronounced. The afore-going, in analogy, applies to other hydrous mixtures. The effects of a number of different cross-links are revealed by the examples.

The separating layer of polyvinyl alcohol or cellulose acetate is required to be non-porous and free of defects (free of holes). The thickness of the separation layer, in general, amounts to between 0.05 and 10 μm, preferably to between 0.1 and 5 μm, with layer strengths of about 1 to 2 μm, in practice, having proved to be particularly suitable.

The non-porous separating layer, dissolved in a suitable solvent, is directly applied to the porous backing layer. The concentration in this respect is non-critical, however, hardly will it be possible to attain sufficiently thin layers by excessively viscous solutions. The preferred solvent for polyvinyl alcohol is water, for cellulose triacetate it is chloroform or trichloroethylene.

Generally, all substances suitable for use as ultrafiltration membranes can be considered as porous backing layers for the multi-layer membranes of the invention. Owing to the desired thermal stability and the unsensitivity to the solvent mixtures to be separated, porous backing layers of polyacrylonitrile (PAN), polysulfone (PS) and hydrolyzed or saponified cellulose acetates will be preferred. Preferably, the porous backing layer has a very close distribution of pore radii with an average pore radius such that the macromolecules of the polymer used for the separating layer of the membrane, preferably polyvinyl alcohol, cannot penetrate into the pores of the backing layer but are rather retained on the surface. In this manner, very uniform, thin and efficient separating layers can be applied to the porous backing layer. The adjustment of the pore radii and of the distribution of the pore radii, on the one hand, can be effected by corresponding conditions in the preparation of the porous backing layer as such, or it can be effected by applying an intermediate layer to a less suitable porous backing layer, in which case, the separating layer is applied to the intermediate layer (see e.g. examples 5 and 6). When using cellulose acetate for the separating layer, pore distribution and average pore radius of the backing layer are less critical, as the molecular weight of cellulose acetate is substantially higher than that of polyvinyl alcohol and, beyond that, also a different molecular configuration prevails. Finally, solutions from cellulose acetate in organic solvents are of a higher viscosity than corresponding aqueous polyvinyl alcohol solutions. For all these reasons, the use of cellulose acetate as a separating layer is less sensitive regarding the pore distribution and the pore radius of the porous backing layer.

The thickness of the porous backing layer is not critical, if only an adequate mechanical strength of the multi-layer membrane is safeguarded. The thickness of the porous backing layer amounts to e.g. 20, 50 or 100 μm, or more.

In a preferred embodiment, the porous backing layer in the inventive membrane is applied to a fleece or to a fabric serving as a carrying layer. As are the other layers, the carrier layer, preferably, is resistant to temperature and chemicals. The carrier layer, on the layer side, preferably, is smooth to avoid a damage to the porous backing layer. Polyesters are the preferred ones; cellulose layers, in general, are not sufficiently smooth. The polyamides actually suitable, in general are less preferred owing to the thermal resistance thereof lower than that of polyesters and owing to their lower solvent strength. The thickness of the carrier layer is not critical either; in practice, thicknesses of between 50 and 150 μm, e.g. approximately 100 μm, have proved to be particularly suitable.

Application and distribution of the polymeric solutions forming the porous backing layer and the non-porous separating layer, generally, are performed in a manner that the polymeric solutions, by way of a knife blade or glass rod, are distributed over and swept clear of the corresponding layer. For this, the layer thicknesses are adjusted in accordance with the desired layer thickness. In addition to that process, in practice, especially for less viscous polymeric solutions, also a process has proved to be suitable that in the American-language literature has been described as the "meniscus coating" or "dip coating". The carrier material to be laminated, with the side to be coated is drawn downwardly over a roll just touching the surface of the polymeric solution to be applied. A meniscus is then formed between the liquid surface and the carrier material, with the surface of the carrier material being wetted by the polymeric solution. In some cases, it is preferred to improve the wettability of the carrier material by the addition of wetting agents. By varying the viscosity of the polymeric solution, the drawing speed, the carrier material and of the dripping time of the polymeric solution, the thickness of the so applied layer of the polymeric solution can be widely varied and reproducibly adjusted.

The permeate flow in kg/h·m² under the test conditions of the temperature, the composition of the mixture to be separated and of the pressure on the permeate side, and the selectivity B of the membrane under the said conditions serve for characterizing of pervaporation membranes. B is a non-dimensional figure representing the concentration ratio of the binary mixture in the permeate divided by the concentration ratio in the feed.

$$B = \frac{c_{\text{water permeate}}/c_{\text{organic solution permeate}}}{c_{\text{water feed}}/c_{\text{organic solution feed}}}$$

The volume of the permeate flow shows heavy dependence on the temperature. While in all examples of embodiment the feed of the liquid mixture was performed under atmospheric pressure, the pressures prevailing on the permeate side amounted to between 10 and 50 mbar. In that range the level of the permeate-sided pressure was without any noteable influence on the permeate flow and the selectivity of the membranes.

The invention will now be described with reference to the drawings, wherein

Figure 2:
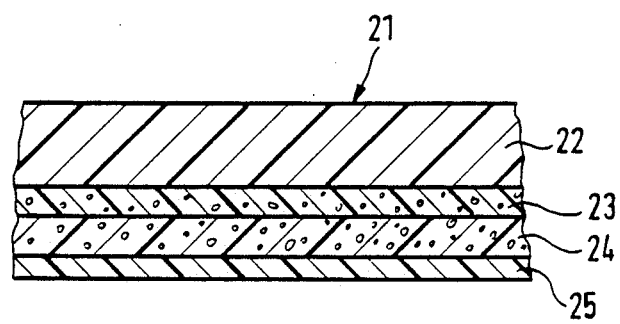

FIG. 1 is a cross-sectional view of a preferred embodiment of a multi-layer membrane of the invention, und FIG. 2 is a cross-sectional view of another preferred embodiment of a membrane according to the invention.

According to FIG. 1, a multi-layer membrane 1 is comprised of a polyester fleece carrier layer 2 having a thickness of 120 μm. Provided thereon is a porous backing layer 3 of polyacrylonitrile having a thickness of 50 μm. The separating layer 4 is comprised of polyvinyl alcohol cross-linked with maleic acid and has a thickness of 1.2 μm. The manufacture of that multi-layer membrane will be described in example 1.

According to FIG. 2, a multi-layer membrane 21 is comprised of a polyester fleece carrier layer 22 having a thickness of 120 μm. Provided thereon is a porous backing layer 23 of polyacrylonitrile having a layer thickness of 50 μm. Provided thereon is a porous intermediate layer (another backing layer) 24 of saponified cellulose triacetate having a thickness of 50 μm. A non-porous separating layer 25 of polyvinyl alcohol cross-linked with maleic acid has a layer thickness of under 1 μm. The production of that multi-layer membrane will be described in examples 5 and 6.

The examples will explain the invention.

The carrier layer as used in the examples is a polyester fleece having a layer thickness of about 120 μm.

The polyvinyl alcohol (PVA) as used is a commercially available product having a degree of saponification of at least 99 percent and an average molecular weight of 115.000 (Daltons).

EXAMPLE 1

A 15% solution of polyacrylonitrile (PAN) in dimethyl formamide (DMF) by means of a knife blade is applied as a layer of a 50 μm thickness to a polyester fleece forming a carrier layer, and is precipitated according to the phase inversion process at a temperature of 8° C. The resulting porous membrane, at a pressure differences of 4 bar, shows a clear water discharge rate of 150 l/h·m² and a retention capacity of more than 99.5 percent for a 1% solution PVA in water.

Subsequently applied to that PAN membrane is a solution of 7 percent by weight PVA in water added to which are 0.05 mole maleic acid per mole monomeric unit PVA. After drying, hardening and cross-linking of the PVA separating layer at 150° C., the PVA separating layer will no longer be soluble either in boiling water. Tests with water/alcohol mixtures, at a feed temperature of 80° C. and a water/alcohol ratio in the feed of ¼ resulted in a selectivity of B=1400 and a rate of permeate flow of 0.04 kg/h·m².

Under otherwise identical conditions except for a water/alcohol ratio in the feed of 5/95, the selectivity was still 9500 at a rate of permeate flow of 0.01 kg/h·m².

EXAMPLE 2

Example 1 is repeated, except for that a reduced PVA concentration of 5% is used in the preparation of the PVA separating layer. Under the conditions as specified, the following values are measured on the final membrane:

Feed 12 percent by weight water, 88 percent by weight ethanol, feed temperature 80° C., selectivity 250, rate of permeate flow 0.05 kg/h·m².

Feed 20 percent by weight water, 80 percent by weight isopropanol, feed temperature 45° C., selectivity 250, rate of permeate flow 0.3 kg/h·m².

Feed 20 percent by weight water, 80 percent by weight acetone, feed temperature 60° C., selectivity 100, rate of permeate flow 0.25 kg/h·m².

EXAMPLE 3

A PAN membrane produced in accordance with example 1, is coated with an aqueous solution of the following composition: PVA 5 percent by weight; formaldehyde 1 mole per mole PVA monomeric unit; hydrochloric acid 1 mole per mole PVA monomeric unit.

After hardening at 155° C., the following separating performances are determined for ethanol/water mixtures at a temperature of 70° C.:

Feed 80 percent by weight ethanol, selectivity 30, rate of permeate flow 1.5 kg/h·m².

Feed 90 percent by weight ethanol, selectivity 50, rate of permeate flow 1.0 kg/h·m².

Feed 99 percent by weight ethanol, selectivity 30, rate of permeate flow 0.25 kg/h·m².

EXAMPLE 4

An 18% solution of polysulfone (see Condensed Chemical Dictionnary, 8th edition, 1971, p. 712) in DMF, in accordance with the description in example 1, is applied to polyester fleece as a carrier layer and is precipitated in water at a temperature of 8° C. by phase inversion. Applied to the so formed porous backing layer is an aqueous solution of 6 percent by weight PVA containing 0.05 mole fumaric acid per mole monomeric unit PVA and is hardened at 150° C. At a temperature of 80° C. and at a feed concentration of 80 percent by weight ethanol in water, a selectivity of 350 and a permeate flow of 0.2 kg/h·m² were measured.

EXAMPLE 5

A 15% solution of PAN in DMF, according to example 1 is applied to a polyester fleece forming the carrier layer and is precipitated in water at a temperature of 15° C. The so obtained porous membrane shows a clear water discharge of more than 150 l/h·m², a retention capacity for a 1 percent PVA solution of 90 percent at an average molecular weight of the PVA of 11500, and of 50 percent at an average molecular weight of the PVA of 72000. After drying, a 1% solution of cellulose triacetate in anhydrous chloroform is applied to the said membrane by "dip-coating", and the solvent is evaporated under the exclusion of moisture. At a room temperature of 80° C., the said membrane, at a feed concentration of 80 percent ethanol in water, showed a selectivity of 10 at a permeate rate of flow of 2 kg/h·m².

EXAMPLE 6

The membrane provided with a separating layer of cellulose triacetate obtained according to example 5 was exposed to an aqueous ammonia solution of a pH-value of 10.5 until complete saponification of the cellulose triacetate. Now the said porous membrane, for PVA of a molecular weight of 115000, showed a retention capacity of in excess of 99.5 percent and, for PVA of a molecular weight of 72000, showed a retention capacity of 98 percent. Coated with a 3 percent PVA solution containing maleic acid as the cross-linking agent, at a feed temperature of 78° C. and at an ethanol concentration of 80 percent, a selectivity of 250 was obtained at a permeate flow rate of 0.5 kg/h·m².

What is claimed is:

1. Apparatus for separating a liquid mixture into separable components comprising said mixture, comprising:
   (a) a composite membrane consisting essentially of (1) a non-porous separating layer having a thickness between 0.05 and 10 μm, said separating layer being useful for separating an aqueous liquid mixture comprising at least one organic liquid, said separating layer being comprised of cross-linked polyvinyl alcohol, and (2) at least one porous backing layer comprised of a second polymer, said composite membrane being in the form of a flat sheet membrane and being capable of separation of mixtures in a pervaporation process;
   (b) means for delivering said liquid mixture to a first free surface of said composite membrane;
   (c) means for applying a vacuum to, or an inert gas stream over, a second free surface of said composite membrane, such that said components of said liquid mixture are separated across said composite membrane by pervaporation; and
   (d) means for removing pervaporated material.

2. An apparatus according to claim 1, wherein said non-porous layer of said membrane has a selectivity B value of at least 30 for a mixture comprising 80 wt% ethanol and 20 wt% water, relative to the total weight of said mixture.

3. An apparatus according to claim 1, wherein said membrane further comprises a carrier layer adjacent to said porous backing layer, said carrier layer comprising a fleece or fabric.

4. An apparatus according to claim 3, wherein said second polymer is a polyacrylonitrile.

5. An apparatus according to claim 3, wherein said second polymer is a polysulfone.

6. An apparatus according to claim 1, wherein said second polymer of said porous backing layer of said membrane is a polyacrylonitrile.

7. An apparatus according to claim 1, wherein said second polymer of said backing layer of said membrane is a polysulfone.

8. An apparatus according to claim 1, wherein said porous backing layer of said membrane has a close distribution of pore radii and has an average pore radius such that polyvinyl alcohol molecules from said non-porous separating layer do not penetrate into the pores of said porous backing layer.

9. An apparatus according to claim 8, wherein said second polymer of said membrane is a saponified cellulose acetate.

10. An apparatus according to claim 9, wherein said second polymer is saponified cellulose triacetate.

11. An apparatus according to claim 10, said membrane comprising two porous backing layers, at least one of said backing layers being comprised of saponified cellulose triacetate.

12. An apparatus according to claim 1, wherein said cross-linked polyvinyl alcohol of said separating layer of said membrane is the product of a process comprising (i) a step selected from the group consisting of etherification, esterification, with a monobasic or a dibasic acid acetalization with a monofunctional or difunctional aldehyde, and a combination thereof, and (ii) the step of rendering the product of step (i) water-insoluble by heat exposure.

13. An apparatus according to claim 1, wherein said cross-linked polyvinyl alcohol of said separating layer of said membrane is cross-linked with maleic acid.

14. An apparatus according to claim 1, said membrane accommodates a permeate flow of at least 1.5 kg/h·m² for said mixture.

15. An apparatus according to claim 1, wherein said non-porous layer of said membrane has a thickness of between 0.1 and 5 μm.

16. Apparatus according to claim 1, wherein said composite membrane accommodates a permeate flow of at least 1.5 kg/h·m² for said mixture.

17. Apparatus according to claim 1, wherein (i) said first polymer is cross-linked polyvinyl alcohol and (ii) non-porous layer has a selectivity value B of at least 30 for a mixture comprising 80 wt% ethanol and 20 wt% water, relative to the total weight of said mixture.

18. Apparatus according to claim 1, wherein said non-porous layer has a thickness of between 0.1 and 5 μm.

* * * * *